US006907389B2

(12) United States Patent
Mehnert et al.

(10) Patent No.: US 6,907,389 B2
(45) Date of Patent: Jun. 14, 2005

(54) PROCESS FOR THE SERIAL TRANSMISSION OF DIGITAL MEASUREMENT DATA

(76) Inventors: Walter Mehnert, Grillparzerstrasse 6, D-85521 Ottobrunn (DE); Thomas Theil, Waldstrasse 9, D-85258 Aufhausen (DE)

( * ) Notice: Subject to any disclaimer, the term of this patent is extended or adjusted under 35 U.S.C. 154(b) by 0 days.

(21) Appl. No.: 10/329,755

(22) Filed: Jun. 24, 2003

(65) Prior Publication Data

US 2003/0204355 A1 Oct. 30, 2003

Related U.S. Application Data

(63) Continuation of application No. 09/612,270, filed on Jul. 7, 2000, now abandoned.

(30) Foreign Application Priority Data

Jul. 9, 1999 (DE) ........................................ 199 32 177
Jul. 16, 1999 (DE) ........................................ 199 33 491

(51) Int. Cl.[7] ................................................ G06F 15/00
(52) U.S. Cl. ........................ 702/189; 370/252; 375/259
(58) Field of Search ..................... 702/75–76, 124–126, 702/178, 189; 370/241, 252; 375/259

(56) References Cited

U.S. PATENT DOCUMENTS

| | | | | |
|---|---|---|---|---|
| 3,114,900 A | | 12/1963 | Anderson | |
| 3,686,631 A | | 8/1972 | Elliot | |
| 3,851,302 A | | 11/1974 | Schmitt | |
| 4,112,264 A | * | 9/1978 | Abramson et al. | 714/712 |
| 4,337,457 A | * | 6/1982 | Tache | 341/57 |
| 4,530,088 A | * | 7/1985 | Hamstra et al. | 370/522 |
| 4,759,038 A | | 7/1988 | Takahashi et al. | |
| 4,797,902 A | * | 1/1989 | Nishiguchi et al. | 375/245 |
| 5,384,811 A | * | 1/1995 | Dickopp et al. | 704/203 |
| 5,402,440 A | * | 3/1995 | Marbot | 375/224 |
| 5,465,270 A | | 11/1995 | Beauducel et al. | |
| 5,550,847 A | | 8/1996 | Zhu | |
| 5,691,714 A | | 11/1997 | Mehnert et al. | |
| 5,726,638 A | * | 3/1998 | Kobayashi | 375/232 |

(Continued)

FOREIGN PATENT DOCUMENTS

| | | |
|---|---|---|
| EP | 716 404 | 11/1995 |
| WO | WO 96 11 457 | 4/1996 |

OTHER PUBLICATIONS

Speech Analysis and Synthesis by Linear Prediction of the Speech Wave, by B.S. Atal et al, The Journal of the Acoustical Society of America, vol. 50 (1971) No. 2, pp. 637–655.

Modulationsverfahren zur Ubertragung von Signalen (V), by R. Mausl, de/der elekromeister—deutsches elektrohandwerk 1984, Issue 21, pp. 1615–1618.

*Primary Examiner*—Marc S. Hoff
*Assistant Examiner*—Mary Catherine Baran
(74) *Attorney, Agent, or Firm*—Sughrue Mion, PLLC

(57) ABSTRACT

For achieving lower transmission frequencies when serially transmitting digital measurement data from a transmitter to a receiver, wherein at the transmitter an absolute value of a continuously measured physical parameter and correction values describing alterations therein are transmitted, it is provided that at the transmitter as well as at the transmitter, using mathematical equations which describe the alteration of the parameter to be measured, an exact value ($\alpha T_{Xb}$) is continuously predicted for a respective time ($T_x$) for which there is not yet a new measured value ($\alpha T_X$) at the receiver, which exact calculated value represents the updated measurement value at the receiver, that at the transmitter upon the occurrence of the measured value ($\alpha T_X$) belonging to the respective time ($T_x$) being considered, its difference relative to the exact calculated value ($\alpha T_{Xb}$) is formed, and that at least one correction value ($\delta\alpha T_X$) representing such a difference is transmitted to the receiver.

9 Claims, 2 Drawing Sheets

U.S. PATENT DOCUMENTS 5,991,842 A 11/1999 Takayama
6,138,196 A 10/2000 Takayama et al.
6,167,079 A * 12/2000 Kinnunen et al. .......... 375/225
6,256,592 B1 * 7/2001 Roberts et al. ............... 702/59
6,272,446 B1 * 8/2001 Baekke et al. .............. 702/189
6,275,782 B1 8/2001 Mann
6,353,868 B1 3/2002 Takayama et al.
6,476,615 B1 * 11/2002 Marbot et al. .............. 324/537
6,690,733 B1 * 2/2004 Baumgartner et al. ...... 375/259

* cited by examiner

PROCESS FOR THE SERIAL TRANSMISSION OF DIGITAL MEASUREMENT DATA

This is a continuation of application Ser. No. 09/612,270 filed Jul. 7, 2000 now abandoned; the disclosure of which is incorporated herein by reference.

BACKGROUND OF THE INVENTION

The invention concerns a process for the serial transmission of digital measurement data from a transmitter to a remotely disposed receiver.

Hereinafter a conceptual distinction is made between values which are actually measured (=measurement values) and calculated values (=exact values), in which respect the latter are identified in that fashion for the reason that, as will be shown in detail hereinafter, within the respectively required range of measurement accuracy, they coincide with the associated, actually measured values, and can thus be correctly referred to as 'exact'.

The expression that the physical parameter whose measurement values are to be transmitted is 'continuously measured' is intended to identify both measurement processes which continuously supply measurement values and also those in which the measurement values occur discontinuously at very short time intervals.

German laid-open application (DE-OS) No 44 43 959 discloses such a process in which the transmitter is arranged directly at a sensor and serves to transmit measurement data which are supplied by the sensor and which are prepared for transmission in digital form to a remotely disposed receiver, in such a way that a minimum level of complication and expenditure in respect of the connecting lines has to be involved. In that case, the sensor is a measuring device for permanently detecting a physical parameter, for example a temperature, a pressure and so forth.

A particularly important area of use for these processes is represented by positional and in particular rotational pickup senders or sensors, in which the physical parameter to be detected is the angular position of a rotating shaft. In that situation, the shaft may be stationary and it may also rotate at a high speed of rotation, for example 12000 rpm.

If, for a situation of use of that kind, there is a requirement for a high resolution capability of for example 22 bits for a full revolution of 2 Π and if levels of acceleration or deceleration respectively of up to $1\times10^5\ s^{-2}$ are permitted, then difficulties are incurred with the known process insofar as it is necessary to select an extremely high transmission frequency or rate in order individually to transmit the very high number of increments including their sign, which occur at high speeds, in such a way that the receiver can construct the respectively current angular position practically in real time as a progressive measurement value by addition of the increments, with the correct sign, to afford the last, completely ascertained absolute value.

SUMMARY OF THE INVENTION

In comparison therewith, the object of the present invention is to develop a process of the kind set forth in the opening part of this specification, in such a way that serial transmission of the measurement data is made possible even at very high rates of change of alteration in the physical parameter to be detected, practically in a real-time mode, without extremely high transmission frequencies being required for that purpose.

To attain that object, the invention provides, according to a first aspect thereof, a process for the serial transmission of digital measurement data from a transmitter to a remotely disposed receiver, wherein at the transmitter end at least one absolute value of a continuously measured physical parameter and correction values describing alterations in said parameter are prepared in digital form and transmitted to the receiver which forms updated measurement values from the transmitted values, wherein on the part of the transmitter as well as on the part of the receiver, using mathematical equations which describe the alterations in time of the parameter which is to be measuring detected, on the basis of exact measured values $\alpha_{Tx-1}$, $\alpha_{Tx-2}$, $\alpha_{Tx-3}$ . . . which the transmitter obtains at moments in time $T_{x-2}$, $T_{x-1}$, $T_x$ which are of equal spacings in respect of time and are accurately known both on the part of the transmitter and also on the part of the receiver, predicted exact values $\alpha_{T(x-2)b}$, $\alpha_{(Tx-1)b}$, $\alpha_{Txb}$ are calculated in advance for moments in time for which the receiver does not vet have an exact measured value {steps 13, 17, 21, 25 and 31, 32, 34, 35, 37, 38, 40 in FIG. 1}, said predicted exact values $\alpha_{T(x-2)b}$, $\alpha_{T(x-1)b}$, $\alpha_{Txb}$ being used as updated measurement values on the part of the receiver, wherein on the part of the transmitter, when a measured value $\alpha_{Tx-2}$, $\alpha_{Tx-1}$, $\alpha_{Tx}$ belonging to a moment in time $T_{x-2}$, $T_{x-1}$, $T_x$ is present, its difference $\delta\alpha_{Tx-2}$, $\delta\alpha_{Tx-1}$, $\delta\alpha_{Tx}$ in relation to the predicted exact value $\alpha_{T(x-2)b}$, $\alpha_{T(x-1)b}$, $\alpha_{Txb}$ is calculated {steps 11, 15, 19, 23 In FIG. 1} and at least one correction value $\delta\alpha_{Tx-2}$, $\delta\alpha_{Tx-1}$, $\delta\alpha_{Tx}$ representing such a difference is transmitted to the receiver {steps 12, 16, 20, 24 in FIG. 1} receiving this at least one correction value {steps 30, 33, 36, 39 in FIG. 1}, and wherein on the part of the transmitter as well as on the part of the receiver the calculation of a predicted exact value $\alpha_{T(x-2)}$, $\alpha_{T(x-1)}$, $\alpha_{Txb}$ {steps 13, 17, 21, 25 and 31, 32, 34, 35, 37, 38, 40 in FIG. 1} involves so many known exact measured values $\alpha_{Tx-1}$, $\alpha_{Tx-2}$, . . . each of which was obtained for an earlier one of said moments in time $T_{x-3}$, $T_{x-2}$, $T_{x-1}$, . . . {steps 10, 14, 18, 22 in FIG. 1}, that said correction value $\delta\alpha_{Tx-2}$, $\delta\alpha_{Tx-2}$, $\delta\alpha_{Tx}$ can be encoded with such a small number of bits to be transmitted, that the deviation between each calculated value and the respective measured value permanently remains within the required level of measurement accuracy.

Those features according to the invention are based on the realisation that, if the alteration in respect of time of a physical parameter is steady, that is to say, can be continuously described by mathematical equations, there exists an n-th order derivative whose alteration within suitably selected measurement intervals only influences the measured value in such a way that the required level of measurement accuracy is maintained.

If the measured values of such a physical parameter are to be detected and transmitted from the transmitter to the receiver, then, instead of a transmission in accordance with DE-OS No 44 43 959, within a measurement interval which has commenced, for each future time $T_x$ which is in that interval or at its end, an 'exact value' $\alpha_{Txb}$ can be calculated simultaneously both on the part of the transmitter and also the receiver by resolving the appropriate mathematical equation which generally involves an (n-1)-th order differential equation, wherein the expression 'exact value' is used to denote a value whose deviation from the value $\alpha_{Tx}$ which is actually measured at the future time $T_x$ is so small that it coincides therewith, within the limits defined by the level of measurement accuracy required.

In accordance with that measurement accuracy and having regard to the possible options in terms of change or alteration, in particular the possible or intended maximum values of the time derivatives of the physical parameter to be measured, the length of the measurement intervals, that is to say the distance between the times at which the measured values are detected, as well as the n-th order number are established, in respect of which it can be assumed that within a measurement interval it does not alter beyond a predeterminable maximum value. That ordinal number n then defines the number of previously obtained, measured values $\alpha_{Tx-1}$, $\alpha_{Tx-2}$, $\alpha_{Tx-3}$ . . . which, jointly with the exactly known times $T_{x-3}$, $T_{x-2}$, $T_{x-1}$, at which they have occurred, to solve the calculation equations, have to be inserted into same. The higher the order n of the time derivative of the measurement parameter (and thus the differential equations to be resolved), whose alteration influences the measurement parameter within the measurement interval within the limits of the required level of measurement accuracy, the greater must be the number of earlier measured values included in the calculation.

If for example in a situation involving monitoring and measuring the rotation of a shaft, the alteration in the angular acceleration can be deemed to be constant, it is theoretically sufficient, after ascertaining a starting measurement value, with ongoing calculation of new exact values, to rely once on three measured values. Further measurements and correction value transmissions would then no longer be required. That theoretical case can be envisaged, but in practice constancy of angular acceleration will persist only over some measurement intervals; it is therefore necessary to continuously implement measurement steps and in the ongoing calculations to rely in each case on three earlier measured values.

If in accordance with the invention the above-specified parameters are correctly established, then the predicted exact value $\alpha_{Txb}$ coincides with the value $\alpha_{Tx}$ which was actually measured at the time $T_x$, within the limits given by the defined level of measurement accuracy.

The assumption that the time derivative of n-th order of the measurement parameter does not alter over a few measurement intervals is realistic, but it does not apply for just any number of successive measurement intervals. If now an alteration which is occurring begins to become effective, then the predicted exact value $\alpha_{Txb}$ is closer to one of the limits of the measurement accuracy range than would be the case without the occurrence of that alteration. In accordance with the invention, it is prevented from running out of the measurement accuracy range by virtue of the fact that, immediately after the end $T_x$ of each measurement interval, at the transmitter end, the correction value $\delta\alpha_{Tx}=\alpha_{Txb}-\alpha_{Tx}$ which can be encoded in a few bits and generally even in only two bits (namely +1, 0, −1) between the calculated exact value and the actually measured value is ascertained and transmitted to the receiver. The sign of that correction value can be negative or positive; the essential consideration is that the correction value 0 is also transmitted.

The influence, contained in that correction value, of the n-th order time derivative which in a measurement interval is admittedly constant but which nonetheless under some circumstances changes over a longer period of time, that is to say including a plurality of measurement intervals, on the measurement value, is therefore continuously detected and transmitted to the receiver which then, just like the transmitter, can take it into account in the subsequent calculations, so that the further predicted exact values $\alpha_{T(x+1)b}$, $\alpha_{T(x+2)b}$, and so forth are still identical within the measurement accuracy range to the associated actually measured values $\alpha_{T(x+1)}$, $\alpha_{T(x+2)}$, and so forth only occurring after the respective calculation, and they can thus be correctly identified as 'exact'.

For the cases which are of particular interest here, involving measurement tracking of the translatory or rotational movement of a body, for example angular measurement of a rotating shaft, the three prerequisites can be specifically stated in summarised form for applicability of the process according to the invention, as follows:

that both on the part of the transmitter and also the receiver, all calculations according to the invention are implemented in accordance with the same laws and relationships which describe the physical procedures involved;

that for each measured value $\alpha_{Tx}$ which is fed to a further processing step, the time $T_x$ for which it reproduces the respective instantaneous value of the detected physical parameter is exactly known; and that the time spacings $T_{x-3}-T_{x-2}$, $T_{x-2}-T_{x-1}$, $T_{x-1}-T_x$ and so forth between two successive times $T_{x-3}$, $T_{x-2}$ and $T_{x-2}$, $T_{x-1}$ and $T_{x-1}$, $T_x$, respectively are ascertained for the measured values $\alpha_{Tx-3}$, $\alpha_{Tx-2}$, $\alpha_{Tx-1}$, $\alpha_{Tx}$ and subjected to further processing in accordance with the invention, are so small that in them the respective contribution afforded by the third time derivative of the physical parameter to be monitored (that is to say for example in a situation involving angular measurement, the alteration in respect of time of angular acceleration), to the instantaneous value, is no greater than the desired level of measurement accuracy or resolution.

For security reasons which will be discussed in greater detail hereinafter, it may also be important to satisfy a fourth prerequisite, more specifically, that the above-specified time spacings $T_{x-3}-T_{x-2}$, $T_{x-2}-T_{x-1}$, $T_{x-1}-T_x$ and so forth are sufficient such that in them the respective contribution which is made by the second time derivative of the physical parameter to be monitored (that is to say in the case of angular measurement, the angular acceleration), to the instantaneous value, can be transmitted in encoded form within such a time spacing.

Then, the deviation ascertained by the transmitter of the calculated exact value $\alpha_{Txb}$ from the measured value $\alpha_{Tx}$ which occurs when the time $T_x$ being considered occurs remains so small that it can be transmitted as a correction value $\delta\alpha_{Tx}$ in encoded form to the receiver even in a very short time, and the receiver then immediately corrects the value $\alpha_{Txb}$ which is also calculated thereby and which has been used hitherto.

In a particularly preferred alternative form of the process according to the invention the times which are involved in the procedure for ascertaining measurement values, that is to say both the past times $T_{x-3}$, $T_{x-2}$, $T_{x-1}$ for which a measured value $\alpha_{Tx-3}$, $\alpha_{Tx-2}$, $\alpha_{Tx-1}$ is already known at both ends, that is to say at the transmitter and at the receiver, and also the time $T_x$ for which firstly an exact value $\alpha_{Txb}$ is calculated and when the transmitter knows the associated new measured value $\alpha_{Tx}$ a correction value $\delta\alpha_{Tx}$ to be transmitted is ascertained, involve exactly identical time spacings which are known at both ends.

By virtue of those exactly identical time spacings (that is to say $T_{x-3}-T_{x-2}=T_{x-2}-T_{x-1}=T_{x-1}-T_x$ and so forth), it is possible for the calculated exact value $\alpha_{Txb}$ already to be calculated in advance, that is to say before the occurrence of the time $T_x$, by virtue of the fact that an intermediate value is calculated from the two last-measured values $\alpha_{Tx-2}$, $\alpha_{Tx-1}$, preferably by linear extrapolation to the future time $T_x$, and added to that intermediate value with the correct sign is an alteration value $\Delta\alpha_{Tx-1}$ which is ascertained for the last time $T_{x-1}$ which has already passed, which alteration value was in turn determined by a procedure whereby linear extrapolation was effected from the two measured values $\alpha_{Tx-3}$, $\alpha_{Tx-2}$ which are associated with the times $T_{x-3}$, $T_{x-2}$ which precede the time $T_{x-1}$ preceding the time $T_x$ being considered, to the preceding time $T_{x-1}$, and the difference was formed between the intermediate value obtained in that way and the measured value $\alpha_{Tx-1}$ associated with the preceding time $T_{x-1}$.

The exact value $\alpha_{Txb}$ calculated in that way differs from the measured value only when the contribution which is afforded by the second time derivative of the physical parameter to be monitored to the instantaneous value has altered in the period $T_x-T_{x-1}$. The maximum error can only be equal to the deviation, corresponding to the correction value $\delta\alpha_{Tx}$, of the future alteration value $\Delta\alpha_{Tx}$ which occurs for the time $T_x$ being considered, from the already known alteration value $\Delta_{\alpha Tx-1}$, and therefore when the above-mentioned third condition is met, it is within the limits of the desired level of measurement accuracy.

When then the time $T_x$ has occurred, for which the prediction being considered was implemented, this then involves the newest measured value $\alpha_{Tx}$ and its deviation from the predicted exact value $\alpha_{Txb}$, that is to say the newest correct value $\delta\alpha_{Tx}$, which alone must be transmitted to the receiver so that it can exactly calculate the actually measured value $\alpha_{Tx}$.

As, when the three prerequisites stated above apply, the correction value $\delta\alpha_{Tx}$ is considerably smaller than each of the alteration values $\Delta\alpha_{Tx-1}$, $\Delta\alpha_{Tx}$ which are small in any case, it can be transmitted in such a short time, even at a comparatively low transmission frequency, that, by means of that correction value $\delta\alpha_{Tx}$ the receiver can calculate not only the measured value $\alpha_{Tx}$ applicable for the time $T_x$, but also the measurement values, with the required level of accuracy and resolution, in real time, and make them available to a user, which occur for all times which are between the time $T_x$ and the next time $T_{x+1}$ for which a new correction value $\delta\alpha_{Tx+1}$ is supplied by the transmitter. That applies in particular also for the time at which transmission of the correction value $\delta\alpha_{Tx}$ is ended. For calculation of intermediate values which represent the physical parameter for times which are between the times $T_x$ and $T_{x+1}$, inter alia the last alteration value $\Delta\alpha_{Tx}$ is split up into a linear and a quadratic component.

In principle therefore it would suffice to transmit only a single time an absolute measured value and an alteration value and then only also correction values, by means of which the alteration values are updated at the receiver end, in which case the updated alteration values in turn serve to update the absolute measurement values.

As, in the case of a pure updating process, transmission errors as occur for example due to faults which have been incurred in the transmission path can give rise to considerable deviations between the updated and the actual values, although the error probability is slight due to the very small time spacings, preferably the procedure also involves repeatedly transmitting measured values and alteration values as such, so that it is possible to implement a compensating adjustment at the receiver end. In that case then the above-mentioned fourth prerequisite must be satisfied.

That transmission is preferably effected in bit-wise or bit group-wise fashion in interlaced or shared relationship with transmission of the correction values so that the above-mentioned conditions are still satisfied.

It should be emphasised once again that, when a new correction value $\delta\alpha_{Tx}$ occurs at the receiver, it is not only possible to calculate back to the measured value $\alpha_{Tx}$ present at the transmitter at the time $T_x$ being considered which has occurred in the meantime, but it is also possible, for at least one time $T_{x+1}$ after the time $T_x$ being considered, and all times therebetween, to predict a respective exact value in real time. The only condition in that respect is that this later time $T_{x+1}$ also involves the same spacing in respect of time in relation to the preceding time $T_x$ which also separates the other times from each other.

The required exact time correlation between the various times can be implemented in a particularly simple fashion by those times being derived from a quartz-accurate frequency which is preferably generated at the receiver end and transmitted to the transmitter.

In that respect this frequency can be so established in per se known manner that it forms on a two-wire line serving for transmission purposes, a standing wave which is current-modulated in such a fashion that each of the half-waves thereof can represent a bit of the data to be transmitted, as is described in EP 716 404 A1.

The transmitted correction values which have been expressly referred to hereinbefore involve encoded differences in respect of values of the parameter to be measured, that is to say angular differences in the case of a rotating shaft. By virtue of the fixed time raster or grid which is predetermined in the present embodiment (exactly identically sized measurement intervals), that is equivalent to the transmission of correction values which directly represent alterations in a higher derivative such as for example the angular speed or angular acceleration and so forth. In the alternative configuration which is also described hereinafter, without a fixed time raster or grid, it may be advantageous, instead of the differences of the 'local values', to transmit such differences of higher time derivatives as correction values.

By means of the prediction procedure it is also possible to take account of signal transit and other delay times in the system. If for example at the receiver end there is a regulator which, on the basis of the measurement data supplied by the sensor, is intended to regulate the physical parameter to be monitored, to a value which can be predetermined in a variable fashion, then for example the time spacing between a time $T_x$ being considered and a subsequent time, for which an exact value is predicted at the receiver end and transmitted to the regulator, can be altered until that time spacing corresponds to the system delay times, which can be recognised from the fact that the regulator operates in a stable mode and no longer oscillates.

According to a further aspect thereof the invention provides a process for the serial transmission of digital measurement data from a transmitter to a remotely disposed receiver, wherein at the transmitter end at least one absolute value of a continuously measured physical parameter and correction values describing alterations in said parameter are prepared in digital form and transmitted to the receiver which forms undated measurement values from the transmitted values, wherein the transmitter, obtaining exact measured values $\alpha_0$, $\alpha_{T1}$, $\alpha_{T2}$, $\alpha_{T3}$ at moments in time $T_0$, $T_1$, $T_2$, $T_3$ {steps 50, 51, 54, 59 in FIG. 2} which do not necessarily involve equal time spacings, measures for each of said moments in time $T_0$, $T_1$, $T_2$, $T_3$ its position in respect of time and generates a time stamp signal characterising said position, which time stamp signal is then transmitted to the receiver {steps 53, 55, 59 in FIG. 2} which starts at the beginning $T_0$ with the same measured value $\alpha_0$ {step 70 in FIG. 2} as the receiver and receives and decodes said time stamp signal {steps 71, 73, 77 in FIG. 2} after each of said moments in time $T_1$, $T_2$, $T_3$ wherein, using mathematical equations which describe the alterations in time of the parameter which is to be measuringly detected, a predicted exact value $\alpha_{T2b}$ is, in advance for moments in time for which the receiver does not vet have an exact measured value, calculated at the transmitter immediately after the occurrence of that moment in time $T_2$ {steps 56, 59 in FIG. 2} and at the receiver immediately when it has received from the transmitter the time stamp signal marking the moment in time $T_2$ being considered {steps 72, 74, 75, 76 in FIG. 2}, on the basis of exact measured values $\alpha_{T1}$, $\alpha_{T2}$, $\alpha_{T3}$ . . . said predicted exact value $\alpha_{T2b}$ being used as updated measurement value on the part of the receiver, wherein on the part of the transmitter, when a measured value $\alpha_{T2}$ belonging to a moment in time $T_2$ is present, its difference in relation to the predicted exact value $\alpha_{T2b}$ is calculated {step 57 in FIG. 2} and at least one correction value $\delta\alpha_{T2}$ representing said difference is transmitted to the receiver {step 58 in FIG. 2}, which receives said correction value $\delta\alpha_{T2}$ {step 76 of FIG. 2} and wherein on the part of the transmitter as well as on the part of the receiver the calculation of a predicted exact value $\alpha_{T2b}$ {steps 56 and 75 in FIG. 2} involves so many known exact measured values $\alpha_{T1}$, . . . , each of which was obtained for an earlier one of said moments in time $T_1$ that said correction value $\delta\alpha_{T2}$ can be encoded with such a small number of bits to be transmitted, tat the deviation between each calculated value and the respective measured value permanently remains within the required level of measurement accuracy.

In this alternative configuration of the process according to the invention the time spacings between the times $T_{x-2}$, $T_{x-1}$, $T_x$ and so forth being considered do not have to be identically equal; the conditions however still apply that the transmitter and the receiver use the same calculation bases and that each of the variable time spacings is so small that in same the respective contribution which is afforded by the third time derivative of the physical parameter to be monitored to the instantaneous value is no greater than the desired level of measurement accuracy or resolution.

In this configuration of the process according to the invention, the calculated exact value $\alpha_{Txb}$ for a time $T_x$ being considered can be calculated only after the occurrence thereof and after the transmitter has transmitted to the receiver a time stamp signal which characterises the absolute position in respect of time of that moment in time. As that transmission can take place within a very short time and transmission of the correction value calculated by the transmitter follows such transmission also very quickly, in this case also, in spite of the use of a comparatively low transmission frequency, the receiver is in a position to follow in a real-time mode the actual variation in the physical parameter to be monitored, by virtue of prediction procedures.

For attaining the object of the invention, it would be counter-productive to use as time stamp signals, complete encoded time measurement values because the amount of data entailed in that case would require a very high transmission frequency.

It is therefore preferable for the transmitter to measure the spacing in respect of time of the respective moment in time $T_x$ from a predeterminable, periodically recurring significant point, preferably from the next following zero-passage of a quartz-accurately periodic reference signal which is available at both ends, and that it transmits that time spacing $\Delta t_{Sx}$ as a time stamp signal to the receiver which, when it recognises the position in respect of time of the significant point in question of the reference signal, can form an exact time measurement value.

So that the receiver receives the required information relating to the position in respect of time of the significant point in question of the reference signal, it is sufficient if the transmitter sends to the receiver at the time $T_x$ in question a signal of very short time length, in which case for example the leading edge of a signal bit can serve as that signal, and the receiver measures the time spacing $\Delta t_{Ex}$ of that signal relative to the next occurring significant point in the reference signal, which generally, that is to say when the signal transit time on the transmission section is greater than half a period of the reference signal, is admittedly not identical to the significant point to which the time stamp signal ascertained by the transmitter refers, but is separated therefrom by a whole number of half-periods of the reference signal.

That number of half-periods also depends on the signal transit time, which can be presumed to be known, on the transmission path. On the assumption which can always be implemented that the fluctuations in the signal transit time are not more than ±¼ of the period length of the transmission frequency, the receiver can ascertain from $\Delta t_{Ex}$, $\Delta t_{Sx}$ and the approximate value of the signal transit time and the period length of the reference signal, the exact time $T_x$ at which the respective measurement value was obtained, without the receiver having been transmitted from the transmitter more than the flank or edge of the signal bit and the associated time stamp signal $\Delta t_{Sx}$ which can be encoded with a few bits, as in fact it only serves to resolve a half-period of the reference signal with the required level of accuracy.

These and other advantageous embodiments and developments of the process according to the invention are set forth in the appendant claims.

DETAILED DESCRIPTION OF THE INVENTION

Figure 1:
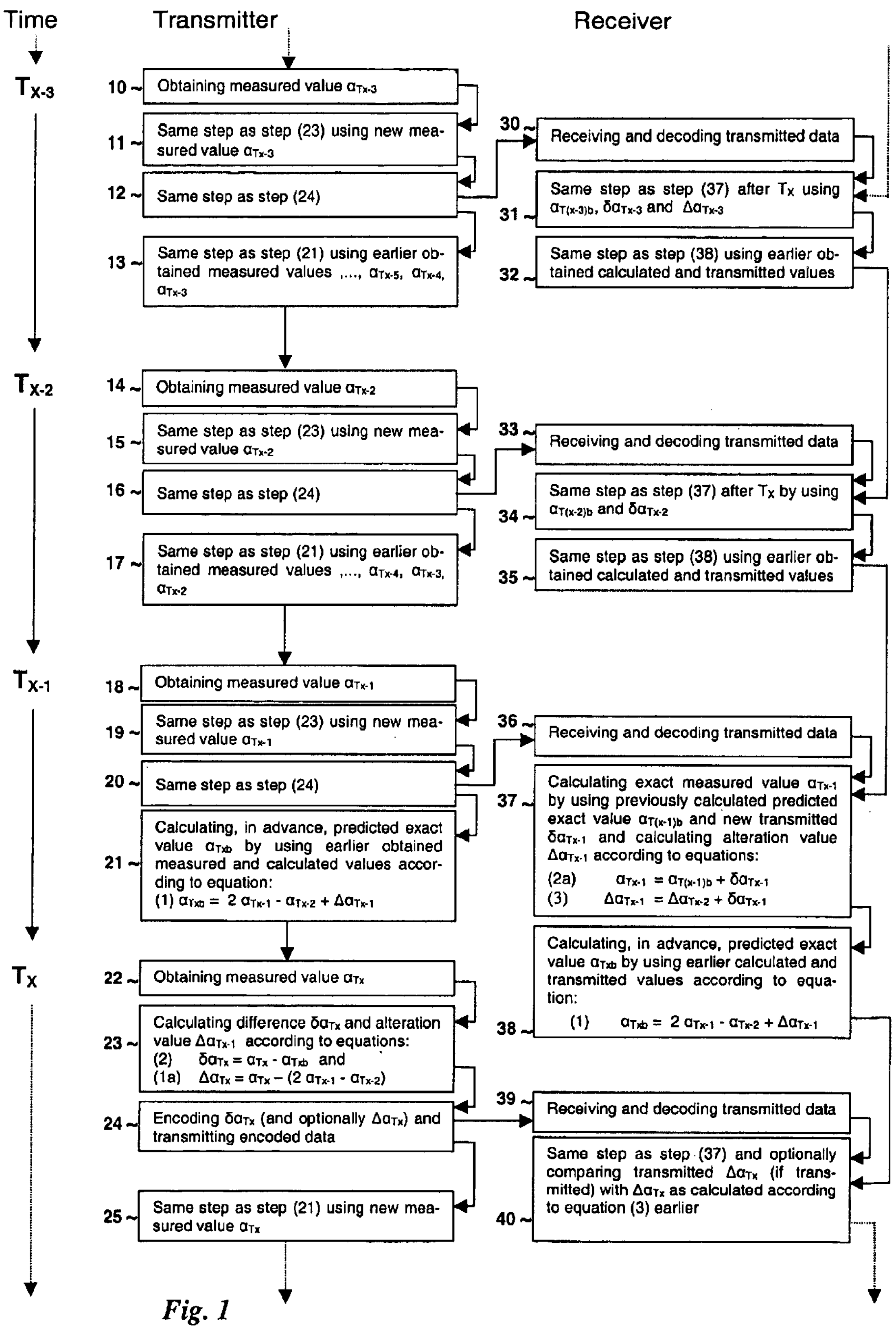
FIG. 1 is a flow chart illustrating a first embodiment of the method of the present invention, in which the accurate measured values are obtained on the transmitter side at moments in time having exactly identical distances in time from one another.

The invention will be described hereinafter by means of an embodiment.

For that purpose, consideration is given to a rotary pickup sender or sensor which measuringly traces the rotation of a shaft with a degree of resolution of 22 bits absolute and a further 26 bits per full revolution, wherein the shaft can reach a maximum speed of rotation of 12000 rpm and the maximum acceleration is $\pm 1\times 10^5$ $s^{-2}$.

The measurement data produced are transmitted by the transmitter in digital form to the receiver on a twisted two-wire line, into which there is impressed from the receiver, as described in EP 0 716 404 A1, an ac voltage wave which at the same time also serves for the power supply at the transmitter end and whose frequency is tuned with quartz accuracy to the line length in such a way that there is a standing wave at least for a binary state which is to be impressed by current modulation. With a line length of 150 m, with a suitable relative dielectric constant, the frequency is for example 329.5 kHz, this affording an oscillation period of about 3 μs, within which 2 bits can be transmitted.

Transmission is effected in a procedure such that bits which represent an angle absolute value are interlaced with bits which represent correction values, change or alteration values, protocol data, angular acceleration values, elements of an identification mask and further items of information.

A suitable protocol can be for example of the following form:

k/k/a/a/a/a/a/p/m/r/ k/k/a/a/a/a/a/p/m/r/ k/k/a/a/a/a/a/p/m/r/ k/k/a/a/a/a/a/p/m/r/ wherein k denotes a correction value bit, a denotes an alteration or change value bit, p denotes an absolute value position bit, m denotes a mask bit and r denotes a reserve bit for further information. In this respect the blocks in actual fact are in directly adjoining relationship; the spaces are only inserted hereinbefore for the sake of clarity.

The reserve bits can be used for example in order to transmit permanently interlaced incremental values or in between times repeatedly angular acceleration values which can be formed by multiple difference formation from the position measurement values of the rotary sensor or which can be supplied by a specific acceleration sensor.

In comparison, the mask bits which can be provided in each block at any location which however is always the same after establishment thereof has been effected serve for identification of the beginning of the word.

Here the block k/k/a/a/a/a/a/p/m/r/ is of a length of 10 bits and can be transmitted by means of 5 periods of the frequency of 329.5 kHz, that is to say in about 15 μs. The starting time of the transmission of each such block is referred to hereinafter as the 'transmission time' $T_x$, for which a new measured value $\alpha_{Tx}$ is to occur on the part of the transmitter.

As each block contains only a single bit for the absolute value in respect of the angular position, 48 such blocks must be transmitted until the receiver has received a complete absolute value which however, when the last bit reaches the receiver, is already about 720 μs 'old', that is to say it can differ considerably from the instantaneous position value.

In order to be able to make available in a real-time mode measurement values which are updated at the receiver end and which differ as little as possible from the actual angular position, the procedure involved is therefore as follows:

It will be assumed that at least three values $\alpha_{Tx-3}$, $\alpha_{Tx-2}$ and $\alpha_{Tx-1}$ measured at earlier transmission times $T_{x-3}$, $T_{x-2}$ and $T_{x-1}$ are already known both at the transmitter end and also at the receiver end. Then, at both ends, there is also an alteration or change value $\Delta\alpha_{Tx-1}$ which has been ascertained for the time $T_{x-1}$, so that both the transmitter and also the receiver can already predict at the time $T_{x-1}$ an exact value $\alpha_{Txb}$ for the time $T_x$ in accordance with the recursion formula:

$$\alpha_{Txb}=2\ \alpha_{Tx-1}-\alpha_{Tx-2}+\Delta\alpha_{Tx-1} \quad (1)$$

It will be seen that an intermediate value $2\ \alpha_{Tx-1}-\alpha_{Tx-2}$ is formed from the values $\alpha_{Tx-2}$ and $\alpha_{Tx-1}$ by linear extrapolation to $T_x$, and summed with the alteration value $\Delta\alpha_{Tx-1}$ which was formed for the last transmission time $T_{x-1}$ and which can be positive or negative.

That alteration value $\Delta\alpha_{Tx-1}$ which like all other alteration values $\Delta\alpha_T$ at a predetermined maximum acceleration $\epsilon$ and a predetermined spacing in respect of time $\Delta t$ cannot exceed the value $\epsilon\Delta t^2$, had in turn been ascertained in accordance with an equation corresponding to formula (1), using the measured values $\alpha_{Tx-3}$, $\alpha_{Tx-2}$, $\alpha T_{x-1}$ for the times $T_{x-3}$, $T_{x-2}$, $T_{x-1}$;

$$\Delta\alpha_{Tx-1}=\alpha_{Tx-1}-(2\ \alpha_{Tx-2}-\alpha_{Tx-3}). \quad (1a)$$

Until the occurrence of the time $T_x$ at which and for which there is a new correct measured value $\alpha_{Tx}$ at the transmitter, the calculated exact value $\alpha_{Txb}$ is used as a substitute for the future measured value $\alpha_{Tx}$.

When then the time $T_x$ occurs, then initially only the transmitter knows the new measured value, by means of which without a relevant time delay it calculates the new correction value $\delta\alpha_{Tx}$ in accordance with the equation:

$$\delta\alpha_{Tx}=\alpha_{Tx}-\alpha_{Txb}. \quad (2)$$

As soon as that correction value including its sign is transmitted to the receiver by the first two bits k/k/ of the protocol block which is just beginning, that is to say in the present example after 3 μs, the receiver is therefore also in a position, without relevant time delay, to calculate the current, updated, exact measured value $\alpha_{Tx}$ and the alteration value $\Delta\alpha_{Tx}$, in accordance with the following equations:

$$\alpha_{Tx}=\alpha_{Txb}+\delta\alpha_{Tx} \quad (2a)$$

and $$\Delta\alpha_{Tx}=\Delta\alpha_{Tx-1}+\delta\alpha_{Tx}. \quad (3)$$

It should be expressly pointed out that this is already possible after 3 μs, that is to say still before the current alteration value $\Delta\alpha_{Tx}$ which is also ascertained by the transmitter is transmitted to the receiver. Theoretically therefore $\Delta\alpha_{Tx}$ would no longer have to be transmitted at all. For security reasons however transmission thereof is preferably implemented in each protocol block in order to be able to detect any transmission errors which may occur and possibly correct them.

It can be shown that each correction value $\delta\alpha_T$, due to rounding errors, can only occur in each case in the range of between 0 and −3 increments (in the case of the present example which with an acceleration gradient of $10^8/s^3$ is based on maximum conditions, in actual fact however it can also alter within <32 μs at best by 1 increment); therefore its representation including sign is always possible with only two bits and a transmission within 3 μs. As this third time derivation of the angular position which is to be measuringly tracked scarcely alters in that time even at maximum angular speed and/or acceleration, the updated values calculated by the receiver for the period from $T_x$ to $T_{x+1}$ reproduce the respective actual measurement value in real time with an accuracy of ±1 increment.

In another process in accordance with the invention the condition that the times being considered, at which a respective new measured value occurs at the transmitter, must involve identical spacings, can be omitted. That however requires the position of those times to be accurately determined on an absolute time scale and characterised by a time stamp signal which must then be transmitted from the transmitter to the receiver. A specific operating procedure which makes it possible to transmit such a highly accurate time stamp signal at a comparatively low frequency will be described in greater detail hereinafter.

Admittedly, the time spacings between the times being considered no longer have to be of equal lengths, but the above-specified prerequisites nonetheless still apply, that the transmitter and the receiver execute their calculations on the basis of the same laws and that each of the time spacings which are now variable is so small that therein the respective contribution which is afforded by the third time derivative of the physical parameter to be monitored to the instantaneous value is no greater than the desired level of measurement accuracy or resolution.

Then, instead of the above-listed equations (1) to (3), somewhat different relationships apply:

It will be assumed that the system begins at a time $T_0$ with a measured value $\alpha_{To}=0$. The following then applies, for a new measured value $\alpha_{T1}$ which occurs at a time $T_1$:

$$\alpha_{T1} = \frac{\varepsilon_{01}}{2}\Delta t_{01}^2 \tag{4}$$

wherein $\Delta t_{01}$ is the time difference between the two times $T_0$ and $T_1$. In accordance with the equations:

$$\varepsilon_{01} = \frac{2\alpha_{T1}}{\Delta t_{01}^2} \tag{4a}$$

and $$\omega_1 = \epsilon_{01}\Delta t_{01} \tag{4b}$$

the transmitter then calculates the mean acceleration $\epsilon_{01}$ which occurred in the period $\Delta t_{01}$, and the speed $\overline{\omega}_1$ which prevails at the time $T_1$, and sends firstly values $\alpha_{T1}$ and a time stamp signal (see below) characterising the time $T_1$ to the receiver which can calculate therefrom on the one hand $\Delta t_{01}$, and on the other hand, in accordance with foregoing equations (4a) and (4b), the mean acceleration $\epsilon_{01}$ and the speed $\overline{\omega}_1$.

When then at a time $T_2$ the transmitter has a new measured value $\alpha_{T2}$, it does not send that value but only the time stamp signal which characterises the time $T_2$ and which enables the receiver to calculate the time spacing $\Delta t_{12}$ between the times $T_2$ and $T_1$.

On the basis of those values, both the transmitter and also the receiver can then calculate an exact value $\alpha_{T2b}$ for the time $T_2$ which has only just occurred, in accordance with the following equation:

$$\alpha_{T2b} = \alpha_{T1} = \omega_1\Delta t_{12} + \frac{\varepsilon_{01}}{2}\Delta t_{12}^2 \tag{5}$$

It should be expressly emphasised once again at this point that all calculations which are to be executed in accordance with the invention can be implemented in such a short time that this computing time is negligibly small in comparison with the transmission times.

As the transmitter already has the new measured value $\alpha_{T2}$, it can calculate from the difference $\Delta t_{12}$ between the times $T_1$ and $T_2$ and the measured value $\alpha_{T2}$ which was obtained at the time $T_2$, the speed $\overline{\omega}_2$ prevailing at that time, the mean acceleration $\epsilon_{12}$ prevailing in the period $\Delta t_{12}$, and the first correction value $$\delta\alpha_{T2} = \alpha_{T2} - \alpha_{T2b} \tag{6}$$

and transmit same to the receiver which, by means of that correction value $\delta\alpha_{T2}$, can calculate the measured value $\alpha_{T2}$ from the exact value $\alpha_{T2b}$ previously used for the time $T_2$.

The transmitter and the receiver now have all parameters in order to calculate from the equation for the actual measured value:

$$\alpha_{T2} = \alpha_{T1} + \omega_1\Delta t_{12} + \frac{\varepsilon_{12}}{2}\Delta t_{12}^2 \tag{7}$$

the mean acceleration $\epsilon_{12}$ prevailing in the period between $T_1$ and $T_2$.

For a time $T_3$ which occurs later and in which the transmitter entails a new measured value $\alpha_{T3}$, the transmitter initially again transmits the associated time stamp signal so that both ends can calculate the time difference $\Delta t_{23}$.

From the time difference $\Delta t_{12}$ and the speed $\overline{\omega}_1$ prevailing at the time $T_1$, and the mean acceleration $\epsilon_{12}$ ascertained in accordance with equation (7), the receiver, in accordance with the following equation:

$$\omega_2 = \omega_1 + \epsilon_{12}\Delta t_{12} \tag{8}$$

calculates the speed $\overline{\omega}_2$ prevailing at the time $T_2$, so that now, with the exception of the most recent measured value $\alpha_{T3}$ and the associated correction value $\delta\alpha_{T3}$, it now has the same information as the transmitter and it can calculate a new calculated exact value $\alpha_{T3b}$ for the time $T_3$, in accordance with an equation corresponding to equation (5).

If an inquiry for a measurement value which for example is associated with any time $T_{2x}$ between the times $T_2$ and $T_3$ comes to the receiver from a user, then by means of the data already available to the receiver, for that intermediate time $T_{2x}$, the receiver can calculate an exact value in accordance with the following equation:

$$\alpha_{T2xb} = \alpha_{T2} + \omega_2\Delta t_{22x} + \frac{\varepsilon_{12}}{2}\Delta t_{22x}^2 \tag{9}$$

wherein $\Delta t_{22x}$ is the spacing in respect of time between the moments in time $T_2$and $T_{2x}$.

This calculated exact time $\alpha_{T2b}$ also corresponds to the value, which is actually present at the time $T_{2x}$ in question, of the physical parameter to be monitored, with a high level of accuracy.

For further times $T_4$, $T_5$, $T_6$ and so forth, the procedure just described above can be continued in a corresponding fashion.

It is important that the transmissions of the time stamp signal and the alteration value can be effected in a substantially shorter time than would be required for transmission of the complete measurement value. In actual fact, the transmission time required in accordance with the invention is so short that even in this alternative configuration, the receiver can follow the actual variation in the physical parameter to be monitored, by a predictive procedure, in real time.

In that respect a point of essential significance is that the time stamp signal represents the respective moment in time in a form which is compressed in such a fashion that transmission is possible within a very short time.

In order to achieve this, a preferred alternative configuration of the process according to the invention provides that a periodic quartz-accurate reference signal serving as a time standard is available both for the transmitter and also the receiver, that reference signal preferably being sent from the receiver to the transmitter. At both ends, the periods or half-periods of that reference signal are counted starting from a zero point signal which the receiver sends to the transmitter in the same manner as is described hereinafter for time signal communication from the transmitter to the receiver.

If the transmitter involves a fresh measured value at a time $T_n$, then firstly it sends the receiver a signal bit whose leading flank or edge serves as a time marker. In addition the transmitter measures the time spacing $\Delta t_{nS}$ of that time marker in relation to an agreed significant point, for example the next zero-passage of the reference signal, and transmits it as a time stamp signal in encoded form to the receiver.

When the receiver receives the time marker, it also measures its time spacing $\Delta t_{nE}$ in relation to the next significant point, for example the next zero-passage of the reference signal. In that case, the two zero-passages referred to will generally not be identical, by virtue of the signal transit time on the transmission path.

On condition that the signal transit time on the transition path fluctuates by not more than ±¼ of the period length of the reference signal, the receiver can ascertain from the transmitted time stamp signal $\Delta t_{nS}$, the time spacing $\Delta t_{nE}$ measured by the receiver itself and the signal transit time which is known apart from instantaneous fluctuations, to which zero-passage the time stamp signal $\Delta t_{nS}$ of the transmitter relates. As that time stamp signal $\Delta t_{nS}$ serves only for time resolution of a period length of the reference signal, it can be encoded with a few bits and transmitted in a very short time.

Here too the principle according to the invention is again applied, that both on the part of the transmitter and also the receiver, on the basis of the same mathematical and physical laws, calculations are carried out which make it possible on the part of the receiver to obtain information with a maximum degree of accuracy although only a minimum amount of information was transmitted by the transmitter.

In contrast to the first of the two processes set forth, in which a 2-wire line is sufficient for transmission between the transmitter and the receiver, the last-described process preferably uses a 3-wire line. Here one line serves as system ground. The second transmits the supply voltage and the reference signal (for example 10 MHz). The third is used for bi-directional data transmission.

That system then admittedly has one line more, but in return it affords the option of sending large amounts of data in both directions, this being almost simultaneously because of the extremely short time-sharing procedure. That means that only about 10 μs are required for the transmission of data from the transmitter to the receiver, which at latest must be effected every 32 μs. The remaining time can be used for the transmission of a similarly large amount of data in the opposite direction.

That affords the advantage that a large amount of data can also be transmitted at high frequency from the receiver to the transmitter, in which respect it is possible to use an ASSI-interface (asynchronous-synchronous-serial interface).

It will be noted from the foregoing description that the described processes can be used not only for rotary or angle sensors but also for linear sensors and quite generally sensor devices which measuringly detect and track other physical parameters.

What is claimed is:

1. A process for the serial transmission of digital measurement data from a transmitter to a remotely disposed receiver, wherein at the transmitter end at least one absolute value of a continuously measured physical parameter and correction values describing alterations in said parameter are prepared in digital form and transmitted to the receiver which forms updated measurement values from the transmitted values, characterised in that on the part of the transmitter as well as on the part of the receiver, using mathematical equations which describe the alterations in time of the parameter which is to be measured, on the basis of exact measured values ($\alpha_{Tx-1}$, $\alpha_{Tx-2}$, $\alpha_{Tx-3}$ . . . ) which the transmitter obtains at moments in time ($T_{x-2}$, $T_{x-1}$, $T_x$) which are of equal spacings in respect of time and are accurately known both on the part of the transmitter and also on the part of the receiver, predicted exact values ($\alpha_{T(x-2)b}$, $\alpha_{T(x-1)b}$, $\alpha_{Txb}$) are calculated in advance for moments in time for which the receiver does not yet have an exact measured value {steps 13, 17, 21 25 and 31, 32, 34, 35, 37, 38, 40 in FIG. 1}, said predicted exact values ($\alpha_{T(x-2)b}$, $\alpha_{T(x-1)b}$, $\alpha_{Txb}$) being used as updated measurement values on the part of the receiver, that on the part of the transmitter, when a measured value ($\alpha_{Tx-2}$, $\alpha_{Tx-1}$, $\alpha_{Tx}$) belonging to a moment in time ($T_{x-2}$, $T_{x-1}$, $T_x$) is present, its difference ($\delta\alpha_{Tx-2}$, $\delta\alpha_{Tx-1}$, $\delta\alpha_{Tx}$) in relation to the predicted exact value ($\alpha_{T(x-2)b}$, $\alpha_{T(x-1)b}$, $\alpha_{Txb}$) is calculated {steps 11, 15, 19, 23 in FIG. 1} and at least one correction value ($\delta\alpha_{Tx-2}$, $\delta\alpha_{Tx-1}$, $\delta\alpha_{Tx}$) representing such a difference is transmitted to the receiver {steps 12, 16, 20, 24 in FIG. 1}, receiving that at least one correction value {steps 30, 33, 36, 39 in FIG. 1}, and wherein on the part of the transmitter as well as on the part of the receiver the calculation of a predicted exact value ($\alpha_{T(x-2)b}$, $\alpha_{T(x-1)b}$, $\alpha_{Txb}$) {steps 13, 17, 21, 25 and 31, 32, 34, 35, 37, 38, 40 in FIG. 1} involves so many known exact measured values ($\alpha_{Tx-1}$, $\alpha_{Tx-2}$, . . . ), each of which was obtained for an earlier one of said moments in time ($T_{x-3}$, $T_{x-2}$, $T_{x-1}$ . . . ) {steps 10, 14, 18, 22 in FIG. 1 }, that said correction value ($\delta\alpha_{Tx-2}$, $\delta\alpha_{Tx-1}$, $\delta\alpha_{Tx}$) can be encoded with such a small number of bits to be transmitted, that the deviation between each calculated value and the respective measured value permanently remains within the required level of measurement accuracy.

2. A process as set forth in claim 1, characterised in that the predicted exact value ($\alpha_{Txb}$) for a moment in time ($T_x$) is obtained by summing {step 21 in FIG. 1} with the correct sign of an alteration value ($\Delta\alpha_{Tx-1}$) and an intermediate value ($2\alpha_{Tx-1}-\alpha_{Tx-2}$) which was ascertained by extrapolation from the measured values ($\alpha_{Tx-1}$, $\alpha_{Tx-2}$) which are associated with the two moments in time ($T_{x-2}$, $T_{x-1}$) preceding that moment in time (TX) wherein that alteration value ($\Delta\alpha_{Tx-1}$) is equal to the difference between the measured value ($\alpha_{Tx-1}$) belonging to the preceding moment in time ($T_{x-1}$) and an intermediate value ($2\alpha_{Tx-2}-\alpha_{Tx-3}$) which was ascertained by extrapolation from the measured values ($\alpha_{Tx-2}$, $\alpha_{Tx-3}$) which belong to the two moments in time ($T_{x-3}$, $T_{x-2}$) preceding the preceding moment in time ($Tx._1$) {step 19 in FIG. 1}.

3. A process as set forth in claim 2, characterised in that after transmission of the respective correction value ($\delta\alpha_{Tx}$), the current alteration value ($\Delta\alpha_{Tx}$) is also transmitted {step 24 in FIG. 1}.

4. A process as set forth in claim 3, characterised in that for at least one moment in time which is between a moment in time ($T_x$) being considered and the next moment in time ($T_{x+1}$) which follows at an accurately defined time spacing, an exact value is predicted by interpolation.

5. A process as set forth in claim 2, characterised in that for at least one moment in time which is between a moment in time ($T_x$) being considered and the next moment in time ($T_{x+1}$) which follows at an accurately defined time spacing, an exact value is predicted by interpolation.

Figure 2:
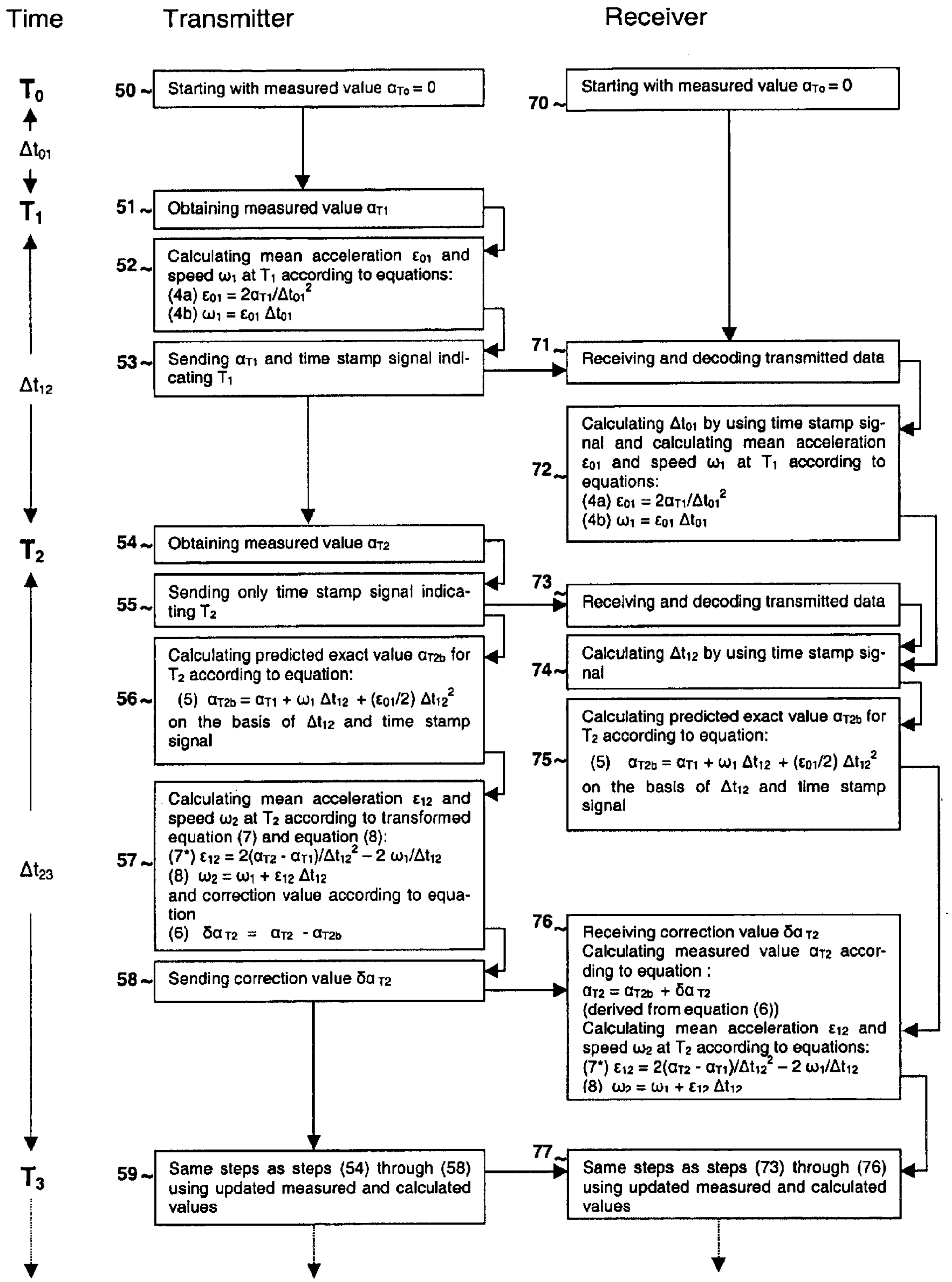
FIG. 2 is a second embodiment of the method of the present invention, in which the accurate measured values are obtained on the transmitter side at moments in time which may have irregular distances in time from one another.

6. A process for the serial transmission of digital measurement data from a transmitter to a remotely disposed receiver, wherein at the transmitter end at least one absolute value of a continuously measured physical parameter and correction values describing alterations in said parameter are prepared in digital form and transmitted to the receiver which forms updated measurement values from the transmitted values, characterised in that the transmitter, obtaining exact measured values ($\alpha_{T1}$, $\alpha_{T2}$, $\alpha_{T2}$) at moments in time ($T_0$, $T_1$, $T_2$, $T_3$) {steps 50, 51, 54, 59 in FIG. 2} which do not necessarily involve equal time spacings, measures for each of said moments in time ($T_0$, $T_1$, $T_2$, $T_3$) its position in respect of time and generates a time stamp signal characterising said position, which time stamp signal is then transmitted to the receiver {steps 53, 55, 59 in FIG. 2}, which starts at the beginning ($T_0$) with the same measured value ($\alpha_0$) {step 70 in FIG. 2} as the receiver and receives and decodes said time stamp signal {steps 71, 73, 77 in FIG. 2} after each of said moments in time ($T_1$, $T_2$, $T_3$)

that, using mathematical equations which describe the alterations in time of the parameter which is to be detected, a predicted exact value ($\alpha_{T2b}$) is, in advance for moments in time for which the receiver does not yet have an exact measured value, calculated at the transmitter immediately after the occurrence of that moment in time ($T_2$) {steps 56, 59 in FIG. 2} and at the receiver immediately when it has received from the transmitter the time stamp signal marking the moment in time ($T_2$) being considered {steps 72, 74, 75, 76 in FIG. 2}, on the basis of exact measured values ($\alpha_{T1}$, $\alpha_{T2}$, $\alpha_{T3}$ . . . ), said predicted exact value ($\alpha_{T2b}$) being used as updated measurement value on the part of the receiver, that on the part of the transmitter, when a measured value ($\alpha_{T2}$) belonging to a moment in time ($T_2$) is present, its difference in relation to the predicted exact value ($\alpha_{T2b}$) is calculated {step 57 in FIG. 2} and at least one correction value ($\delta\alpha_{T2}$) representing said difference is transmitted to the receiver {step 58 in FIG. 2}, which receives said correction value ($\delta\alpha_{T2}$) {step 76 of FIG. 2} wherein on the part of the transmitter as well as on the part of the receiver the calculation of a predicted exact value ($\alpha_{T2b}$) {steps 56 and 75 in FIG. 2} involves so many known exact measured values ($\alpha_{T1}$, . . . ), each of which was obtained for an earlier one of said moments in time ($T_1$) that said correction value ($\delta\alpha_{T2}$) can be encoded with such a small number of bits to be transmitted, that the deviation between each calculated value and the respective measured value permanently remains within the required level of measurement accuracy.

7. A process as set forth in claim 6, characterised in that the measuring of the position in respect of time of the moments in time ($T_1$, $T_2$, $T_3$) is effected in each case by a procedure whereby, at the transmitter end, the time spacing of the moment in time ($T_1$, $T_2$, $T_3$) in question from a predeterminable significant point of a defined period of a quartz-accurately periodic, electrical reference signal which is available both at the transmitter and also at the receiver is measured and transmitted as a time stamp signal to the receiver {steps 53, 55 in FIG. 2} which evaluates same having regard to the signal transit time on the transmission path.

8. A process as set forth in claim 7, characterised in that the significant point adopted is the last zero-passage of the reference signal which directly follows the moment in time ($T_1$, $T_2$, $T_3$) considered.

9. A process as set forth in claim 8, characterised in that the signal transit time on the transmission path is taken into consideration by a procedure whereby at the moment in time ($T_1$, $T_2$, $T_3$) in question the transmitter sends a time marker signal to the receiver which measures its time spacing ($\Delta t_{Ex}$) from the next zero-passage of the electrical reference signal, and that, from the time spacing ($\Delta t_{Ex}$) measured by the receiver, the time stamp signal, the accurately known period duration of the electrical reference signal and the signal transit time which is known in units of said period duration on the transmission path on which the time stamp signal is transmitted, the receiver ascertains the zero-passage in relation to which the transmitter measured the time stamp signal.

* * * * *